(12) United States Patent
Lee

(10) Patent No.: US 7,561,899 B2
(45) Date of Patent: Jul. 14, 2009

(54) METHOD AND APPARATUS FOR CONTROLLING AND APPLYING RESOURCE OF IDLE SCREEN ON MOBILE

(75) Inventor: Changseok Lee, Gangnam (KR)

(73) Assignee: Insprit Co., Ltd., Seoul (KR)

( * ) Notice: Subject to any disclaimer, the term of this patent is extended or adjusted under 35 U.S.C. 154(b) by 53 days.

(21) Appl. No.: 10/522,598

(22) PCT Filed: Apr. 20, 2004

(86) PCT No.: PCT/KR2004/000897

§ 371 (c)(1),
(2), (4) Date: Jan. 26, 2005

(87) PCT Pub. No.: WO2005/104572

PCT Pub. Date: Nov. 3, 2005

(65) Prior Publication Data

US 2006/0156256 A1    Jul. 13, 2006

(51) Int. Cl.
*H04B 1/38* (2006.01)
*H04M 1/00* (2006.01)
(52) U.S. Cl. .......... 455/566; 455/412.1; 455/414.2; 455/414.3; 345/1.1; 345/1.2; 715/781; 715/725
(58) Field of Classification Search .......... 455/412.1, 455/466, 414.2, 566, 414.3, 414.4, 412.2; 345/169, 172, 173, 1.1–1.3, 2.1–2.3, 106, 345/902, 903; 715/781, 825, 826, 828, 829, 715/841, 857
See application file for complete search history.

(56) References Cited

U.S. PATENT DOCUMENTS

| 6,850,781 | B2 * | 2/2005 | Goto .......................... 455/566 |
| 6,912,664 | B2 * | 6/2005 | Ranganathan et al. ....... 713/320 |
| 7,039,423 | B2 * | 5/2006 | Daniel et al. ............. 455/456.3 |
| 2002/0080195 | A1 * | 6/2002 | Carlson et al. .............. 345/853 |
| 2004/0068458 | A1 * | 4/2004 | Russo .......................... 705/36 |
| 2004/0077340 | A1 * | 4/2004 | Forsyth ................... 455/414.1 |
| 2005/0153745 | A1 * | 7/2005 | Smethers ..................... 455/566 |

FOREIGN PATENT DOCUMENTS

WO    WO 02/14976    *    2/2002

* cited by examiner

*Primary Examiner*—Nay A Maung
*Assistant Examiner*—Tuan H Nguyen
(74) *Attorney, Agent, or Firm*—Global IP Counselors, LLP

(57) ABSTRACT

The present invention relates to a mobile communication terminal and method of driving the same, and an idle screen service system and method using the same. According to the present invention, the method includes the steps of (a) allowing a user to set content information; (b) allowing a service-providing server to classify the content information and to allocate a stack; (c) allowing idle screen information corresponding to the content information to be pushed; (d) allowing the user to request detailed content information and to receive the requested content information; and (e) allowing the content information to be displayed according to a predetermined screen configuration of a mobile communication terminal, wherein the content information of step (c) is displayed according to a given template configuration.

33 Claims, 15 Drawing Sheets

Fig. 11

METHOD AND APPARATUS FOR CONTROLLING AND APPLYING RESOURCE OF IDLE SCREEN ON MOBILE

TECHNICAL FIELD

The present invention relates to a mobile communication terminal and method of driving the same, and an idle screen service system and method using the same. More particularly, the present invention relates to a mobile communication terminal, which has an idle screen function providing idle screen information that is set in a terminal and an Internet service by a user to a user mobile communication terminal, and displaying the provided idle screen information, and provides a method of displaying an idle screen, a method of driving the same, and an idle screen service system and method using the same.

BACKGROUND ART

With the development of wireless Internet service, a user-oriented information service has been provided, which has come to popularize a wireless Internet. Generally, in a wireless Internet service system, information is transmitted to a user in the form of a SMS (Short Message Service) message. Information received as the SMS message is stored in a mobile communication terminal as a simple message. In this case, multimedia information such as financial information and entertainment banners are not consistently shown.

In a current wireless Internet service system, the use of multimedia information has increased due to the adoption of color screens on mobile communication terminal, the higher quality of the portable mobile communication devices, the improvement of wireless Internet speed, and the like.

Further, a conventional information transmission method is accomplished through SMS service for specialized information that is not information set by a user. Thus, there is a disadvantage in that a user cannot set and use a variety of financial information and entertainment information.

Moreover, in the conventional information transmission service using SMS service, the amount of data that can be transmitted at once is limited. Thus, there is a problem in that an audio or video type information cannot be provided to a user.

Furthermore, the conventional information transmission service using SMS simply transmits information. Thus, there is a problem in that it does not provide an interactive function with a user who accesses a relevant wireless Internet web site through a hyperlink function.

Also, the conventional information providing method has problems in that a user can obtain information only through access using an Internet access application or browser built in a portable mobile communication device, and specialized information for every user cannot be provided.

In order to solve the above-described conventional problems, there was proposed Korean Patent Registration No. 391291, the applicant of which is the same as that of this application.

Korean Patent Registration No. 391291 discloses that content information to be provided to a mobile communication terminal are converted into a message format which is suitable for transmission through a mobile communication network, and the converted sliding message is transmitted to the mobile communication terminal so that a user can confirm the content information. However, Korean Patent Registration No. 391291 does not disclose concrete embodiments of a method of configuring templates in which contents information is displayed and a method of providing the information. In this connection, the present invention proposes a more detailed method of configuring templates and a method of providing information.

Technical Problem

Accordingly, the present invention has been made in view of the above problems occurring in the prior art, and it is an object of the present invention to provide a mobile communication terminal having an idle screen control function in which idle screen information for user information is received/stored, and the stored idle screen information is displayed.

Another object of the present invention is to provide a method of driving a mobile communication terminal having the idle screen control function, and an information providing method.

Still another object of the present invention is to provide a method of providing information requested by a user using a mobile communication network for providing relevant information to a mobile communication terminal according to information set by a user who wants to receive the information through the mobile communication terminal or an Internet accessible PC, and an idle screen service method.

Further another object of the present invention is to provide a system for performing the idle screen service method using the mobile communication network.

Further another object of the present invention is to provide a method of displaying resources stored in a portable mobile communication device, which are frequently used by a user, on an idle screen in the form of an icon so that the user can easily use the resources.

Further another object of the present invention is to provide a method of operating and managing a channel so that the transfer of information can be controlled and managed in an efficient manner.

Technical Solution

To achieve the above objects, according to the present invention, there is provided an apparatus for controlling and operating resources of an idle screen for a mobile communication terminal having an idle screen control function, including the mobile communication terminal on which desired content information is displayed through a mobile communication network; a content providing server for providing the content information; an idle screen providing server that provides a message corresponding to the provided contents information to a message providing server; and the message providing server for receiving the message, which is converted to have an idle screen message format from the idle screen providing server, and then providing the message to the mobile communication terminal through the communication network, wherein the mobile communication terminal comprises a data viewer, which is a module for receiving push data or pull data for information set by a user and displaying those data according to a predetermined format, and the idle screen providing server comprises an idle screen control system that provides a function of generating an idle screen message, a contents information management server that provides a community service, a PDM server that performs an optimization function of personal information management, and a CRM server that provides a variety of services depending on a user.

According to the system in accordance with the present invention, the contents information providing server and the idle screen providing service server can be physically constructed as a single server. It is also possible to provide information requested by a user using the mobile communication network for providing relevant information to the mobile communication terminal according to information that is set by the user who wants to receive the information.

According to the present invention, there is provided a method of controlling and operating resources of an idle screen for a mobile communication terminal in a method of controlling the idle screen of the mobile communication terminal of a system for providing contents information that is transmitted to the mobile communication terminal, including the steps of (a) allowing a user to join a service so as to receive content information through the mobile communication terminal, and to set or select the content information; (b) allowing a service server to operate cooperatively with a content information provider, classify multimedia information received from the content information provider based on the content information within the service server, and allocate a channel and a stack; (c) allowing idle screen information corresponding to the content information that is set or selected by the user to be pushed from the service server, and the pushed information to be displayed on an idle screen; (d) allowing the user to pull detailed content information among pushed content information on the idle screen, which is displayed on an initial screen, and to receive the pulled content information; and (e) allowing the content information that is received in step (d) to be read from a memory and a storage unit of the mobile communication terminal, and the content information to be displayed according to a predetermined screen configuration of the mobile communication terminal, wherein the content information displayed on the idle screen in step (c) is displayed based on a given template configuration.

Advantageous Effects

According to a method of the present invention, it is possible to provide information requested by a user using a mobile communication network for providing relevant information to a mobile communication terminal according to information that is set by the user who wants to receive the information. Further, resources stored in a portable mobile communication device, which are frequently used by a user, can be displayed on an idle screen in the form of an icon as a divided screen, a screen of a sliding mode or in explicit real time. Also, a service provider can allocate channels for specific uses such as providing contents and providing a service of an external service provider, and can thus promote various business.

BRIEF DESCRIPTION OF DRAWINGS

FIG. 11 is a diagrammatical view of divided screens according to an embodiment having divided multimedia screens;

BEST MODE

Preferred embodiments of the present invention will now be described in detail with reference to the accompanying drawings.

Figure 1:
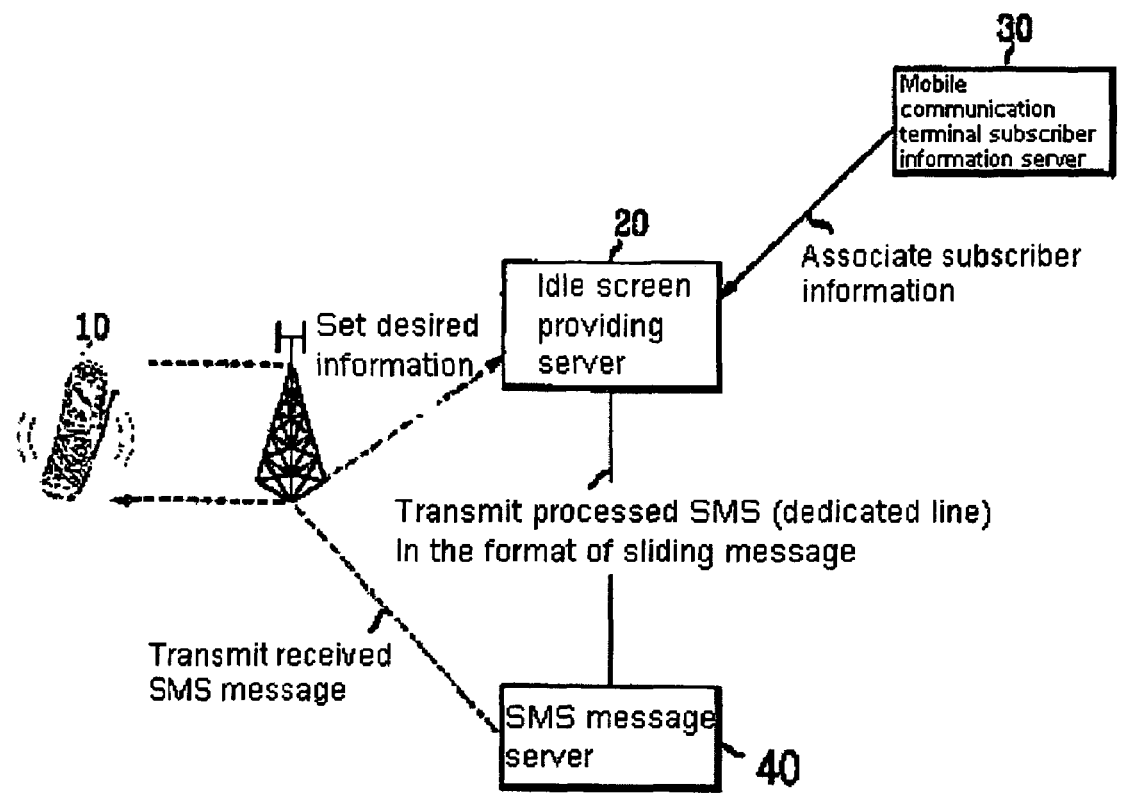
FIG. 1 is a view illustrating the configuration of an idle screen service system using a mobile communication network according to the present invention.

FIG. 1 is a view illustrating the configuration of an idle screen service system using a mobile communication network according to the present invention.

Referring to FIG. 1, the idle screen service system using the mobile communication network according to the present invention includes a mobile communication terminal 10, an idle screen providing server 20, a mobile communication terminal subscriber information server 30, and an SMS message server 40.

The mobile communication terminal 10 has access to the idle screen providing server 20 through the mobile communication network, sets desired information, receives an SMS message based on the set information through the mobile communication network, stores the received SMS message in a memory of the mobile communication terminal, combines the stored information and converts it into an image form to be displayed, and displays the stored information in a given cycle or when an event occurs.

The idle screen providing server 20 is a server in which a contents providing server for providing a variety of contents and an idle screen providing server are integrated into one. At this time, the two servers can be physically separated.

The contents providing server integrated into the idle screen providing server 20 provides a variety of content including news information, financial information, entertainment information, educational information, weather information, shopping information, a schedule, auction information, etc. to the idle screen providing server 20. Further, the contents providing server allows a user to set information that will be received via the mobile communication network in the mobile communication terminal 10, and provides an SMS message of contents information, which is converted into an idle screen message format, to the SMS message server 40 based on subscription information from the mobile communication terminal subscriber information server 30. At this time, a transmission line of the processed SMS message can preferably include a dedicated line.

The idle screen providing server 20 provides a variety of content including news information, financial information, entertainment information, educational information, weather information, shopping information, a schedule, auction information, etc. to the mobile communication terminal 10.

The SMS message server 40 receives the SMS message that is processed into the idle screen information form from the idle screen providing server 20, and transmits the SMS message through the mobile communication network.

It has been described above that information of various content, which has been converted into the idle screen information format, is converted into the SMS message through the SMS message server, which is used in the mobile communication network, as an example. However, it will be evident that if IMT-2000 and the like including HTTP, CBS, SMS, etc. is commercialized, the above process can be accomplished through a component for converting information into the message format of IMT 2000.

Figure 2:
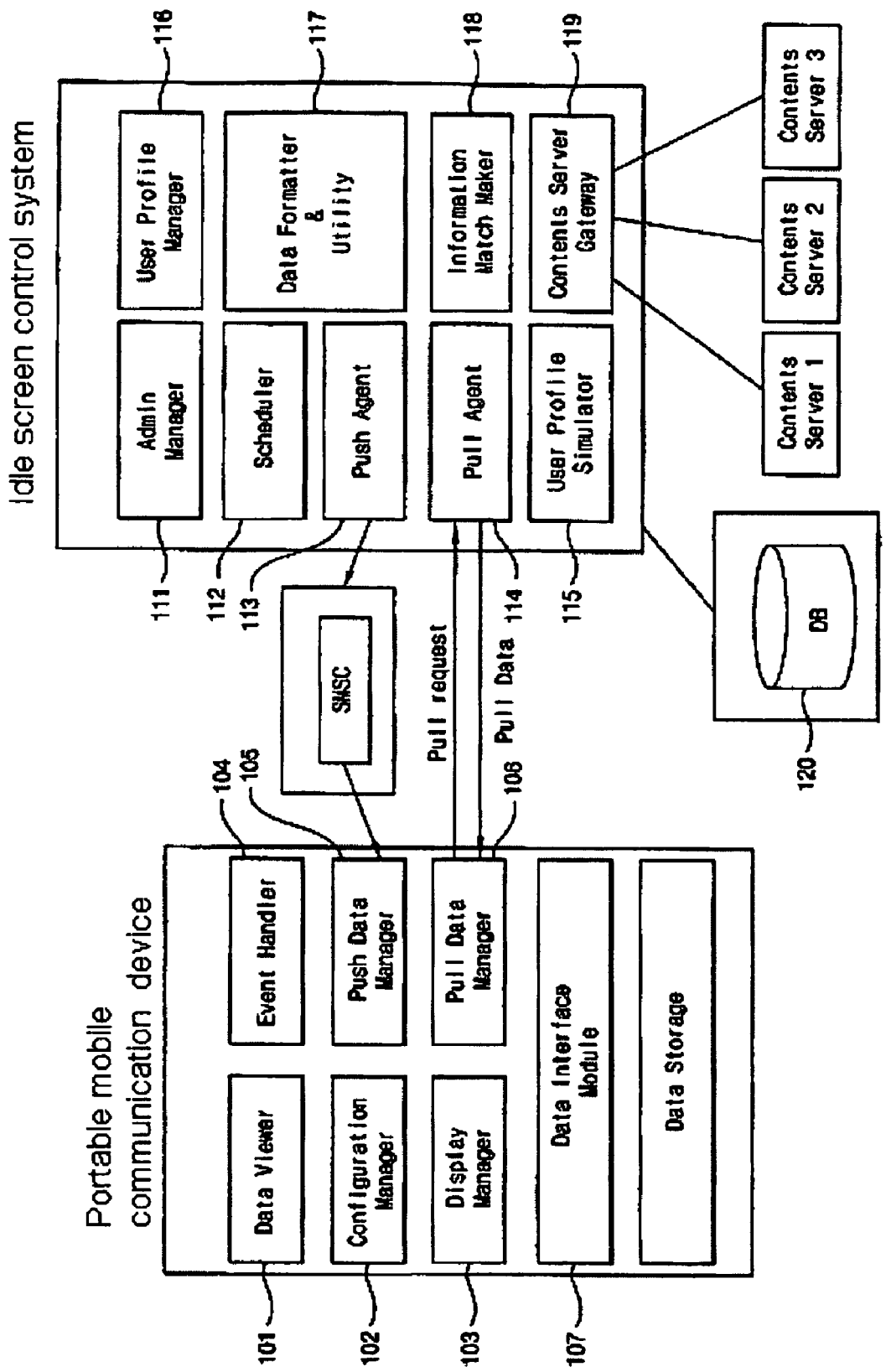
FIG. 2 is a diagrammatical view showing the configuration between a portable mobile communication device and an idle screen control system according to the present invention.

FIG. 2 is a diagrammatical view showing the configuration between the portable mobile communication device and the idle screen control system according to the present invention.

Referring to FIG. 2, the portable mobile communication device and the idle screen control system according to the present invention includes a data viewer 101, a configuration manager 102, a display manager 103, an event handler 104, a push data manager 105, a pull data manager 106, a data interface module 107, an administration manager 111, a scheduler 112, a push agent 113, a pull agent 114, a user profile simulator 115, a user profile manager 116, a data format & utility 117, an information match maker 118, a contents server gateway 119 and a database 120.

The data viewer 101 includes a module and other utilities that cooperatively operate with an image decoder and contents player for allowing information set by a user to be displayed in a format defined by pull data. The configuration manager 102 manages data configuration information of respective regions constituting the idle screen, and the history that is set by a user through the terminal screen.

The display manager 103 properly displays data constituting the respective regions of the idle screen, and is responsible for the display of text and image, the display of quick launch icons set by a user, a navigation focus process, a pop-up process, and so on. The event handler 104 processes various events generated by a user or a terminal, and is responsible for various key events including a direction key and event processes such as data view and various anti-interruption processes generated from a terminal. The event handler 104 can execute a built-in browser or a virtual machine (VM) application, etc., if needed.

The push data manager 105 is a module for processing push data, and is responsible for rejection, storage, display, etc. of data. The push data can include control data for initiating a data pull or setting an environment of a terminal, as well as general data. The pull data manager 106 is a module for processing pull data, and can transfer data to the data viewer module for display, if needed. Further, the pull data manager 106 enables a pull operation to be performed according to control data of push data.

The data interface module 107 is constructed utilizing push related API of a terminal, such as SMS, CBS, Data Service, etc., and is responsible for the interface of the idle screen control system.

The administration manager 111 is a module for managing the idle screen control system. It is responsible for management and authentication of an administrator account, various statistical data reporting, process monitoring and management (start, stop, restart, etc.), configuration and the like. The scheduler 112 allows a user to search a time, cycle, set event, and so on, which are set in a profile, and to perform a necessary operation (push).

The push agent 113 serves to transmit push data that are processed by the data formatter 117 to the push system (SMS, CBS) of the service provider. The pull agent 114 is a module for processing a data pull request from a terminal, and serves to pull data requested by a terminal to the terminal.

The user profile simulator 115 serves to process user profile setting through a PC having access to the Internet and terminal simulation therefore. The user profile manager 116 is a module for allowing a user to manage his profile, and it manages configuration information management of each region, information receive cycle or time setting, change, addition and deletion of a profile, user authentication, and the like, and operates in association with the configuration manager 102.

The data formatter and utility 117 serves to convert data extracted from the information match maker 118 into a format, which can be recognized by the idle screen control client of the terminal before being sent to the terminal. It includes various utilities (image conversion, etc.), which are necessary for data formatting, etc.

The information match maker 118 serves to search data that is set in a profile by a user and to extract only data set by the user from data received from the contents server.

The contents server gateway 119 is a module that provides an interface for receiving data from an external contents server that provides contents to be transmitted to the terminal. The database 120 serves to store and manage user profile, contents, various statistical information, and the like.

Figure 3:
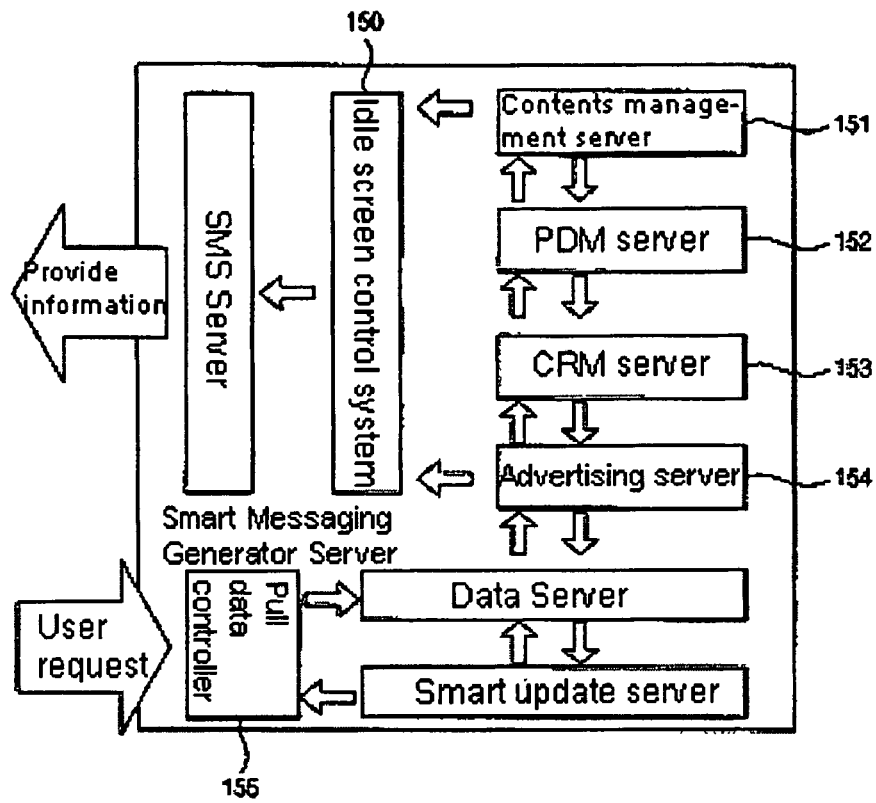
FIG. 3 is a view of a block diagram showing the construction of an idle screen control server according to the present invention.

FIG. 3 is a view of a block diagram showing the construction of the idle screen control server according to the present invention.

Referring to FIG. 3, the idle screen control server according to the present invention allows respective functions to provide a wireless Internet push and pull message management solution through optimal cooperation. The idle screen control server includes an idle screen control system 150, a contents management server 151, a PDM server 152, a CRM server 153, an advertising server 154, a pull data controller 155, and so on.

The idle screen control system 150 provides a function of generating an idle screen SMS message, and can perform real-time assignment of channel headers by information, real-time generation and updating of channel information, compression and splitting of image information, and the like. Further, the contents management server 151 can provide information such as news, finance, entertainment, fortune and shopping, positional information, community service of meeting information, etc. The PDM server 152 allows management of personal information to be optimized. In addition, the CRM server 153 allows a variety of services based on a user's propensity to be easily provided. The advertising server 154 is responsible for various banner advertising, policy public information, etc. through a wireless Internet connection.

The pull data controller 155 manages updating of information when an event occurs or at a given cycle in response to an information transmission module, which is requested by a portable mobile communication device. It also transmits data according to a request from the terminal, and allows synchronization of personal information between the terminal and the server.

Figure 4:
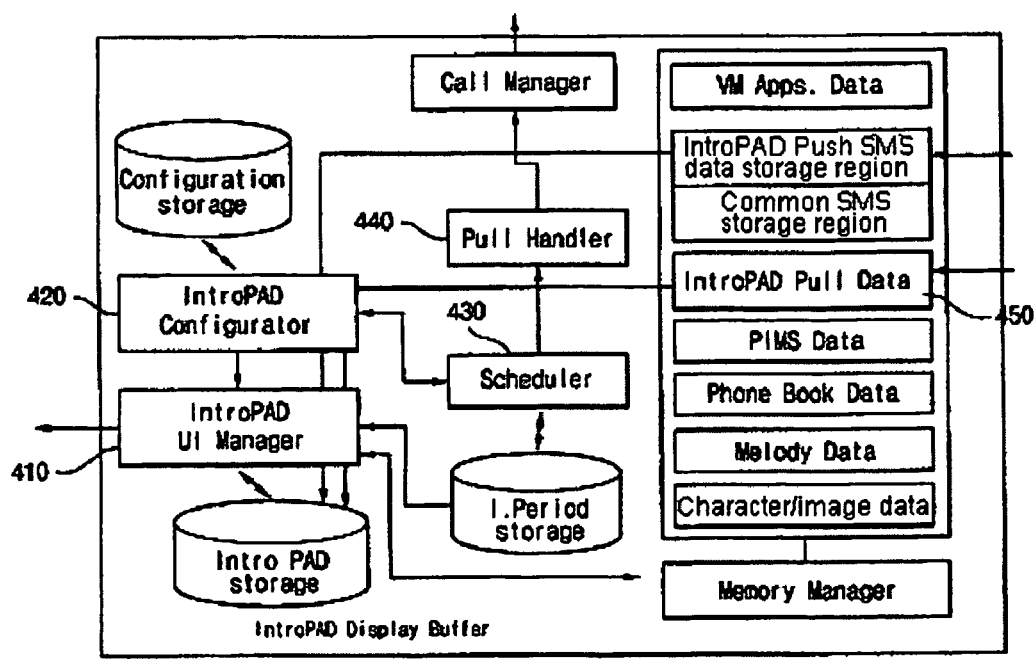
FIG. 4 is a view of a block diagram showing the construction of a mobile communication terminal according to the present invention.

FIG. 4 is a block diagram showing the construction of a mobile communication terminal according to the present invention.

An owner of a mobile communication terminal can specify the type of an information service, which will be provided through a screen of the terminal, and the type that the service is displayed on the screen.

The terminal must display IOD (Information On Demand) provided by the server in the form desired by a user. The terminal processes a request for IOD information through two types.

The first type is to process SMS message information or location or environment information for requesting a server for information through push data. The received SMS information is managed by the storage of the terminal. If the push data have SMS information to be displayed on the screen, they are displayed through an IntroPAD UI manager 410. If the push data are environment information related to display environment or information cycle, they are processed by an IntroPAD configurator 420. The IntroPAD configurator 420 processes information on an updating cycle or a display type through the scheduler 430 and the IntroPAD UI manager 410.

The second type is a process depending on the updating cycle. That is, the scheduler 430 requests the IOD data from the server to a pull handler 44 every updating cycle that is specified by a user. The pull handler 440 receives pull data from a pull server (not shown) and stores the pull data in a storage region of the IntroPAD pull data 450, and transfers the received information to the IntroPAD UI manager 410 so that it is displayed on the mobile communication terminal of the user.

Figure 5:
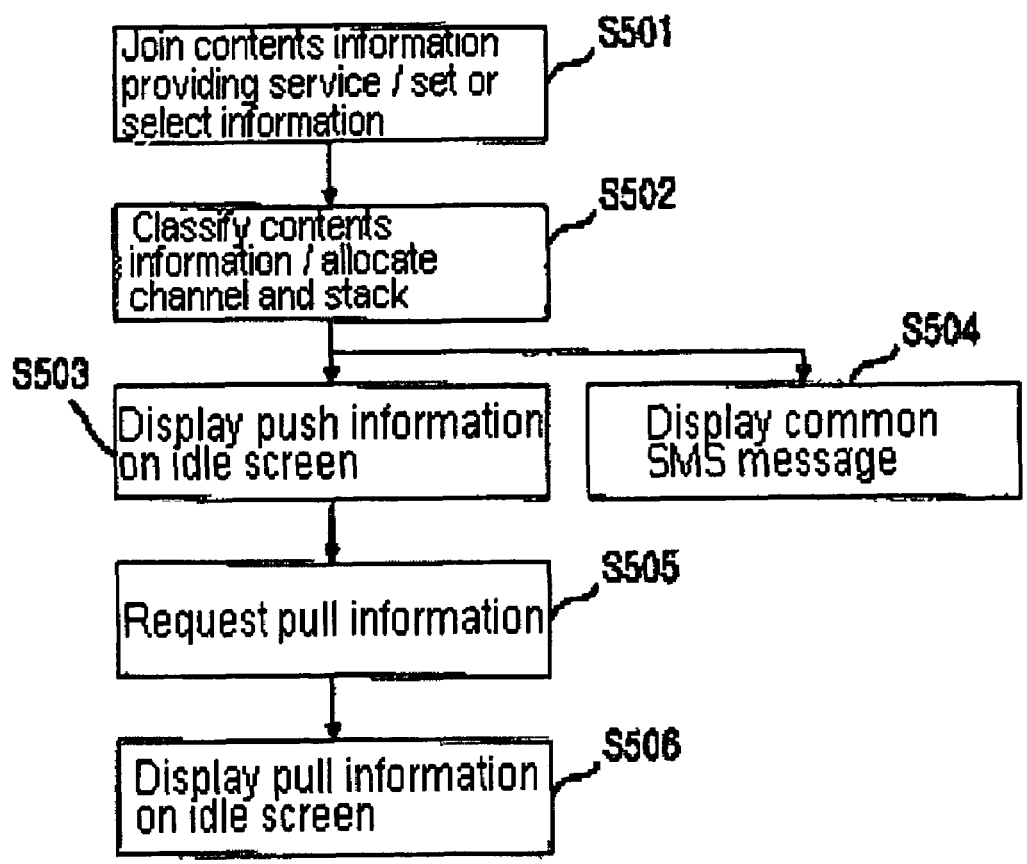
FIG. 5 is a view of a flowchart showing an idle screen display method of the mobile communication terminal according to the present invention.

FIG. 5 is a view of a flowchart showing an idle screen display method of the mobile communication terminal according to the present invention.

A user joins a service in order to receive content information using a mobile communication terminal, and sets or selects the contents information (S501). The service-providing server can cooperatively operate with the contents information provider, and can include the contents providing server. The service-providing server serves to classify text information according to content information within the server, and allocates a stack (S502).

An idle screen corresponding to the contents information, which is set or selected by the user, is pushed from the service-providing server. The pushed information is displayed on the idle screen (S503). At this time, the method further includes the steps of, before the pushed information is displayed on the idle screen, determining whether a SMS message has been received, and if it is determined that the SMS message is received, determining whether a corresponding SMS message is idle screen information; if it is determined that the received SMS message is a common SMS message, displaying the common SMS message on the display unit (S504); and if the received SMS message is idle screen information, classifying an idle screen message and then storing the classified messages in a given stack of the memory.

At this time, the received idle screen message can be set to a mode in which a specific content is set if the user of the mobile communication terminal wants to receive it, or can be provided in a mode of pushing given information for advertising on the part of a contents provider.

Then, a user can pull detailed content information from among the push content information from the idle screen displayed on the initial screen, and then receive the requested content information (S505). The content information received at step S505 is read from the memory and the storage unit of the mobile communication terminal, and is displayed according to a predetermined screen configuration of the mobile communication terminal (S506).

Thereafter, the content information displayed on the idle screen at step S503 is displayed according to a given template configuration.

Figure 6:
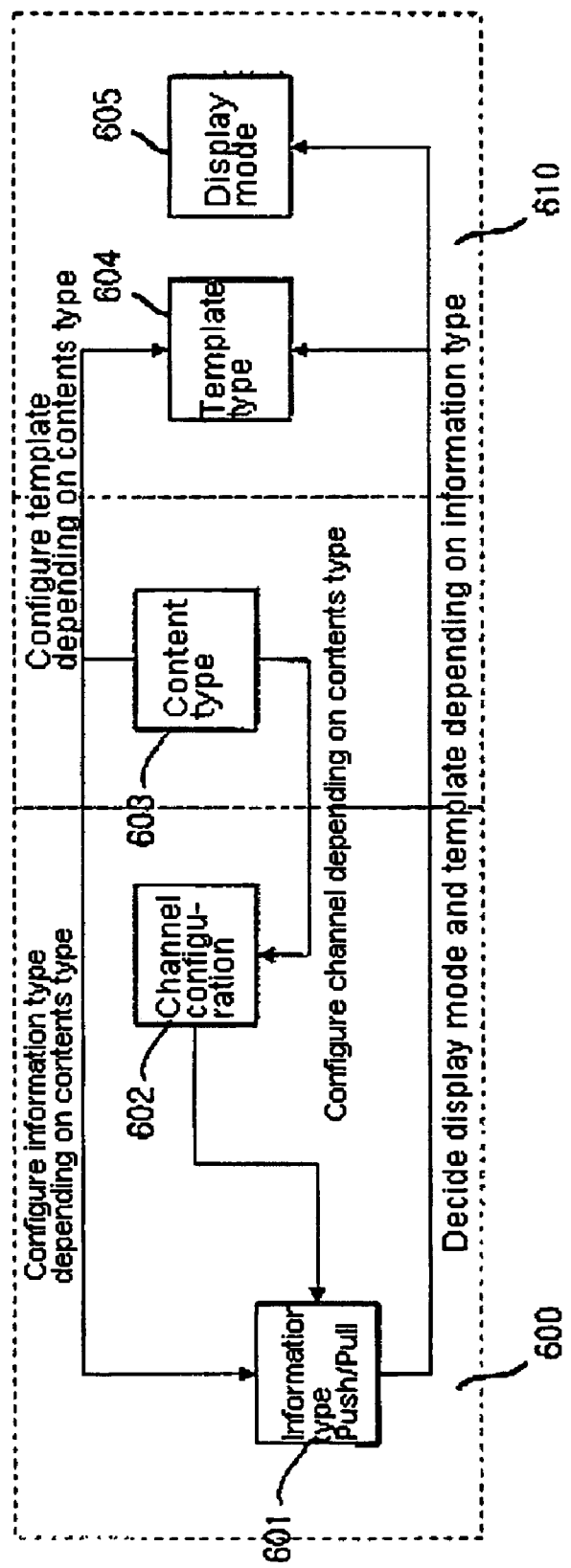
FIG. 6 is a view of a flowchart showing an information processing structure of the service step of the screen display method.

FIG. 6 is a view of a flowchart for explaining an information processing structure by the service step.

Referring to FIG. 6, in a service-providing server 600, an information type 601 can be configured according to a content type 603, and a channel configuration 602 can be constructed according to the content type 603. In a mobile communication terminal 610, a template type 604 can be constructed according to the content type, and a display mode 605 can be determined and displayed.

The content type 603 is a classification system depending on a content type that is provided to a content provider (CP) The content type is classified into text, image, animated image, motion picture, table and so on, which are respectively defined to be C1, C2, C3, C4, C5, C6, etc. The platform supports file formats such as .txt, .bmp, .png, .Gif, .sis, and .mpeg according to the content type. The size of data is classified as push and pull information, and is defined according to the content type.

The configuration of the information type 601 depending on the content type is classified into a push information type and a pull information type. The push information is classified into Notification type and Information type. Notification type has only a call back address value for data pull, and Information type has some information and a call back address value and supports SMS Push, Wap push, http push. Information type can support detailed information in the case of http push. Pull information is classified into Push & Pull type and Find & Pull type. Push & Pull type is for retrieving detailed information through Call back of Information push or Notification push. Find & Pull type is for retrieving detailed information of corresponding data.

The channel configuration 602 is provided according to a template that provides information classified by every content type. The template type 604 is divided into Main, Sub, and others depending on UI. The display mode 605 provides a sliding method, an icon enlargement method, a channel switch method, or an explicit real-time mode method. The channel configuration 602, the template type 604 and the display mode 605 will be described in detail later on.

Figure 7:
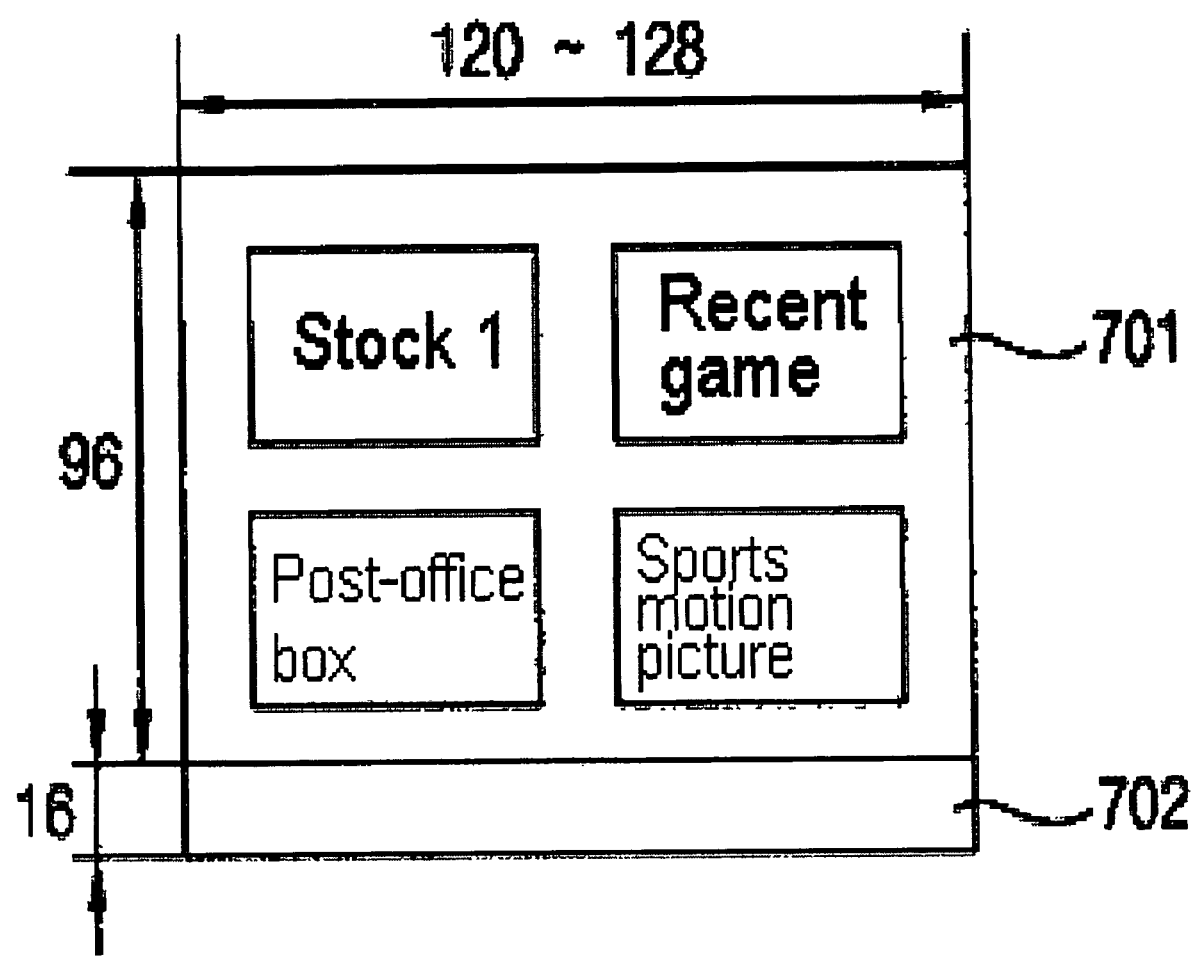
FIG. 7 is a view showing an idle screen template of the mobile communication terminal according to an embodiment of the present invention.

FIG. 7 is a view showing an idle screen template of the mobile communication terminal according to an embodiment of the present invention.

Referring to FIG. 7, a region 701 is a region for displaying up to 4 services in the form of multimedia, and providing various display modes so that various display layouts can be provided to a user. A region 702 is a region for displaying a quick launch icon for executing resources within a portable mobile communication device or a VM application and having access to a wireless Internet web site in a small icon form.

Figure 8:
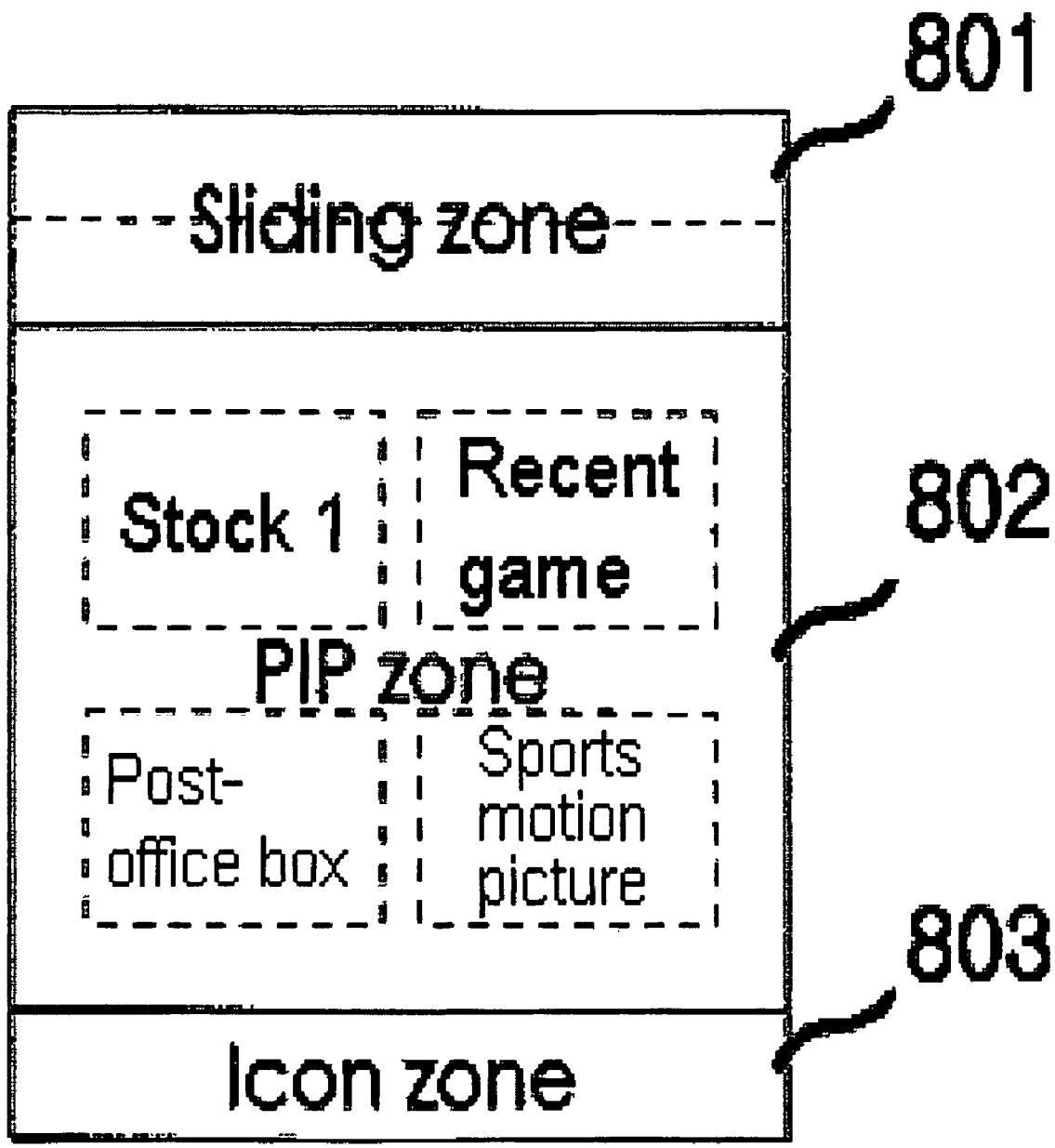
FIG. 8 is a view of an idle screen template of the mobile communication terminal according to another embodiment of the present invention.

FIG. 8 is a view showing an idle screen template of the mobile communication terminal according to another embodiment of the present invention.

Referring to FIG. 8, a region 801 is a region for displaying sliding text and sliding images. A region 802 is a region for displaying up to four services in multimedia form. A region 803 is a region for displaying a quick launch icon for executing resources within a portable mobile communication device or a VM application and having access to a wireless Internet web site in a small icon form.

Figure 9:
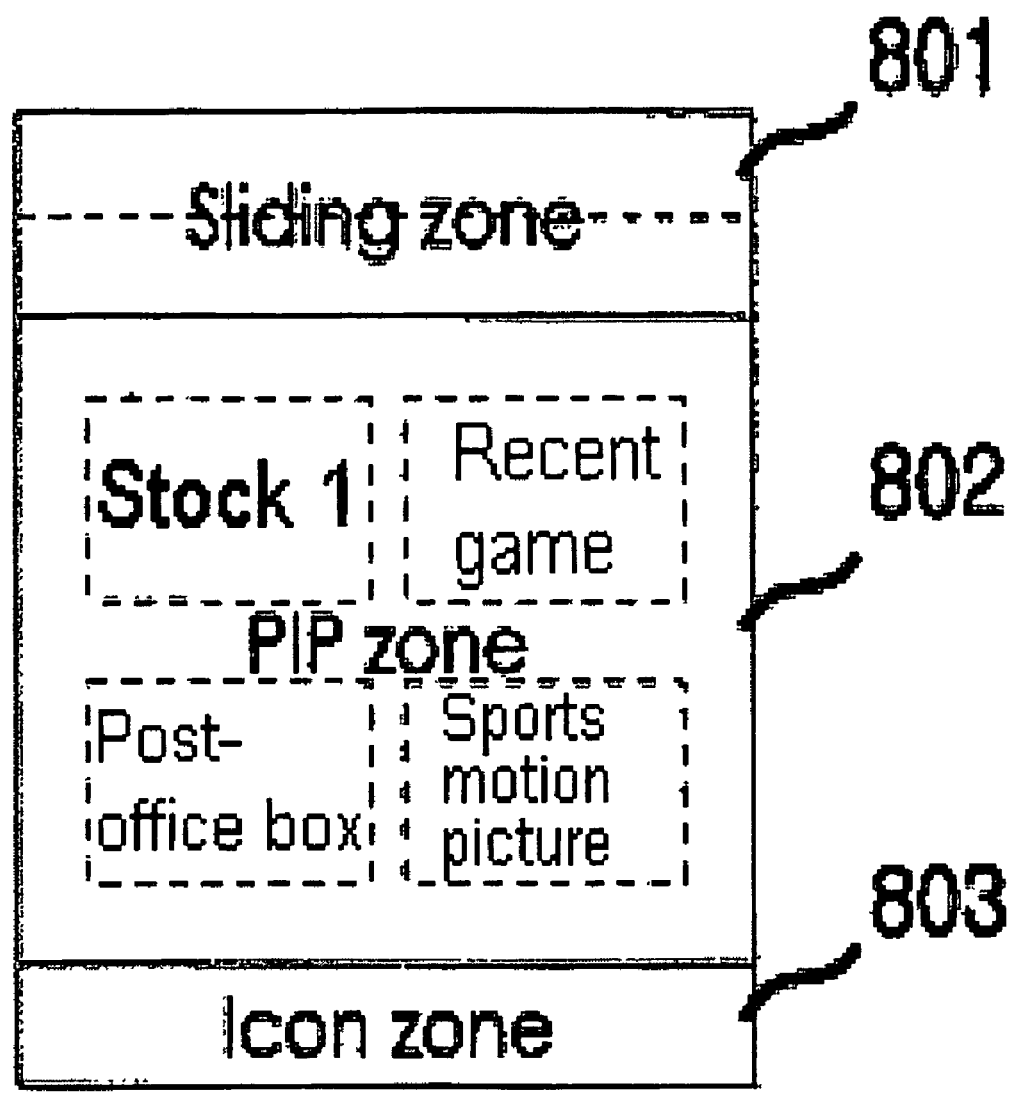
FIG. 9 is a view showing an idle screen template of the mobile communication terminal according to still another embodiment of the present invention.

FIG. 9 is a view showing an idle screen template of the mobile communication terminal according to still another embodiment of the present invention.

Referring to FIG. 9, a region 901 is a region for displaying a title bar to represent the type of an idle screen service. A region 902 is a channel switch region for changing the content display. A region 903 is a region for displaying a content information service in multimedia form. A region 904 shows a quick launch icon for executing resources within a portable mobile communication device or a VM application and having access to a wireless Internet web site in a small icon form, and a real-time information providing icon capable of receiving information in real time.

Figure 10:
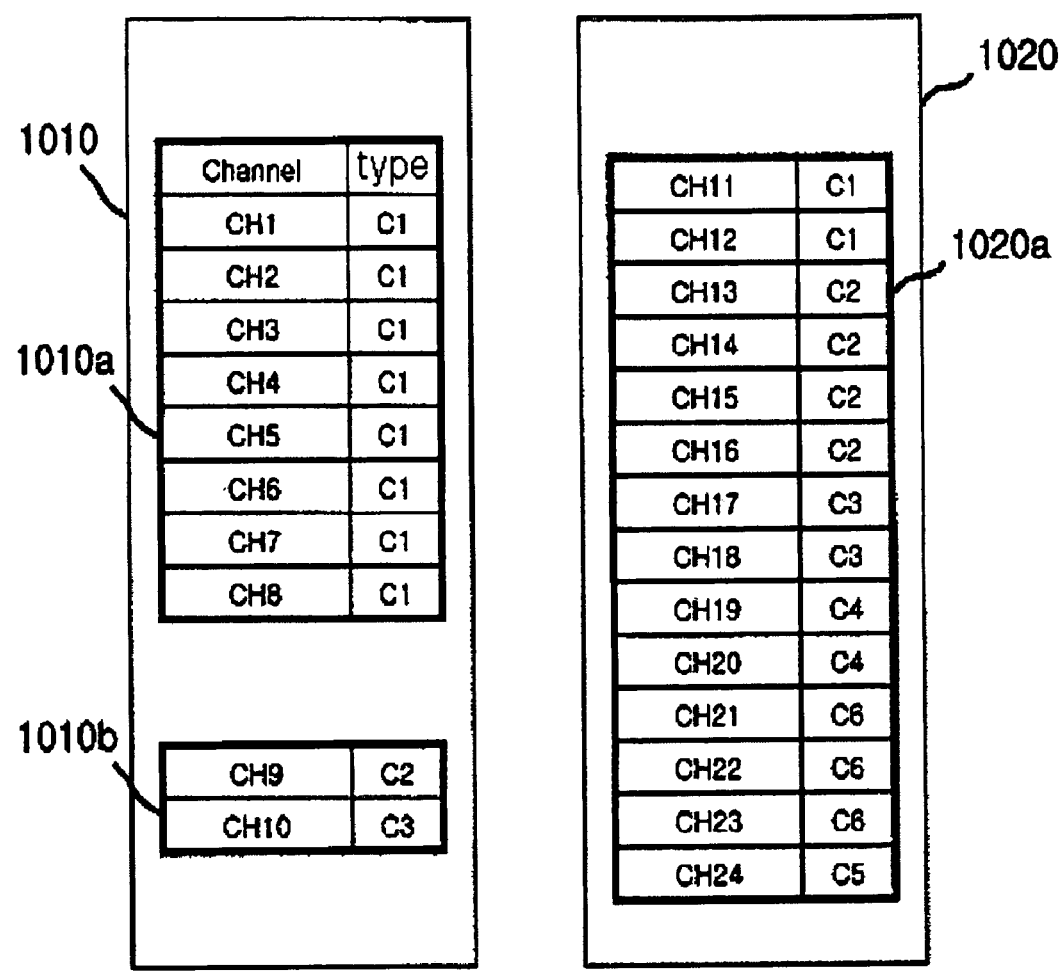
FIG. 10 is a diagrammatical view showing a channel configuration that is provided from a service provider for providing contents information according to an embodiment of the present invention.

FIG. 10 shows a channel configuration that is provided from the service provider for providing content information according to an embodiment of the present invention. There is shown in FIG. 10 an embodiment in a case where content information is pushed to the mobile communication terminal. However, even when detailed information on content information is pulled, channel configuration is possible. It is possible to construct a channel by classifying a sliding region 1010 and an image region 1020 among a divided screen displayed on the mobile communication terminal. Further, the sliding region 1010 is composed of a text information channel 1010*a* that contains only text information and an image information channel 1010*b* that contains image information. The image region 1020 on which the contents information is displayed is composed of a channel 1020*a* in which text and image contain mixed information.

At this time, types C1 to C6 of the content information, which correspond to respective channels of each of the regions, are specified. The channel configuration on the service provider side is connected to the screen region of the mobile communication terminal. A concrete example of the channel configuration displayed on the screen of the mobile communication terminal is shown in FIG. 11.

Figure 11:
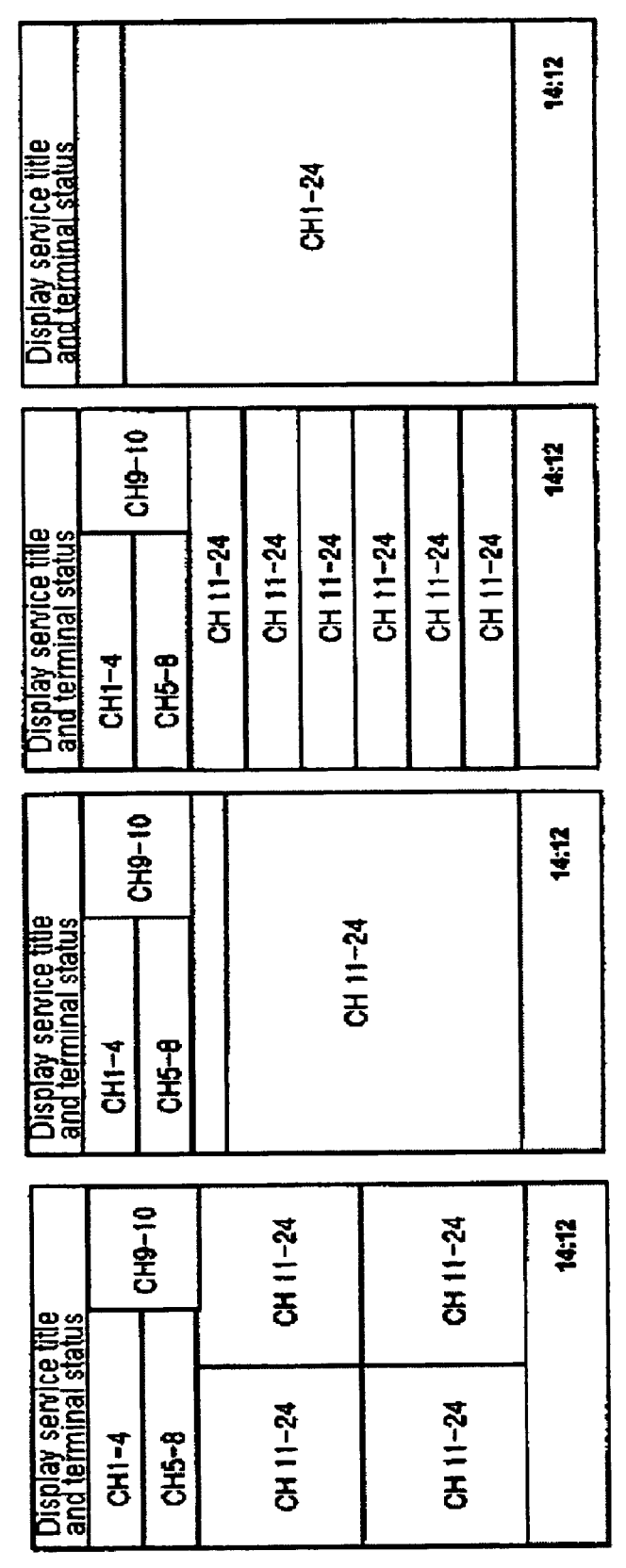

FIG. 11 shows an embodiment of the template configuration displayed on the display of the mobile communication terminal when the divided screen provided in multimedia form is channeled. As shown in FIG. 11, regions that display the multimedia screen shown in FIGS. 7 to 9 can be channeled for every content information type. Further, the screen, which is displayed when the channel constructed by the content information providing server shown in FIG. 10 is displayed on the mobile communication terminal associated therewith, can have various displays depending on the template configuration shown in FIG. 11.

At this time, a user can select a corresponding channel, enlarge content information that matches the corresponding channel, and display the enlarged content information.

Figure 12:
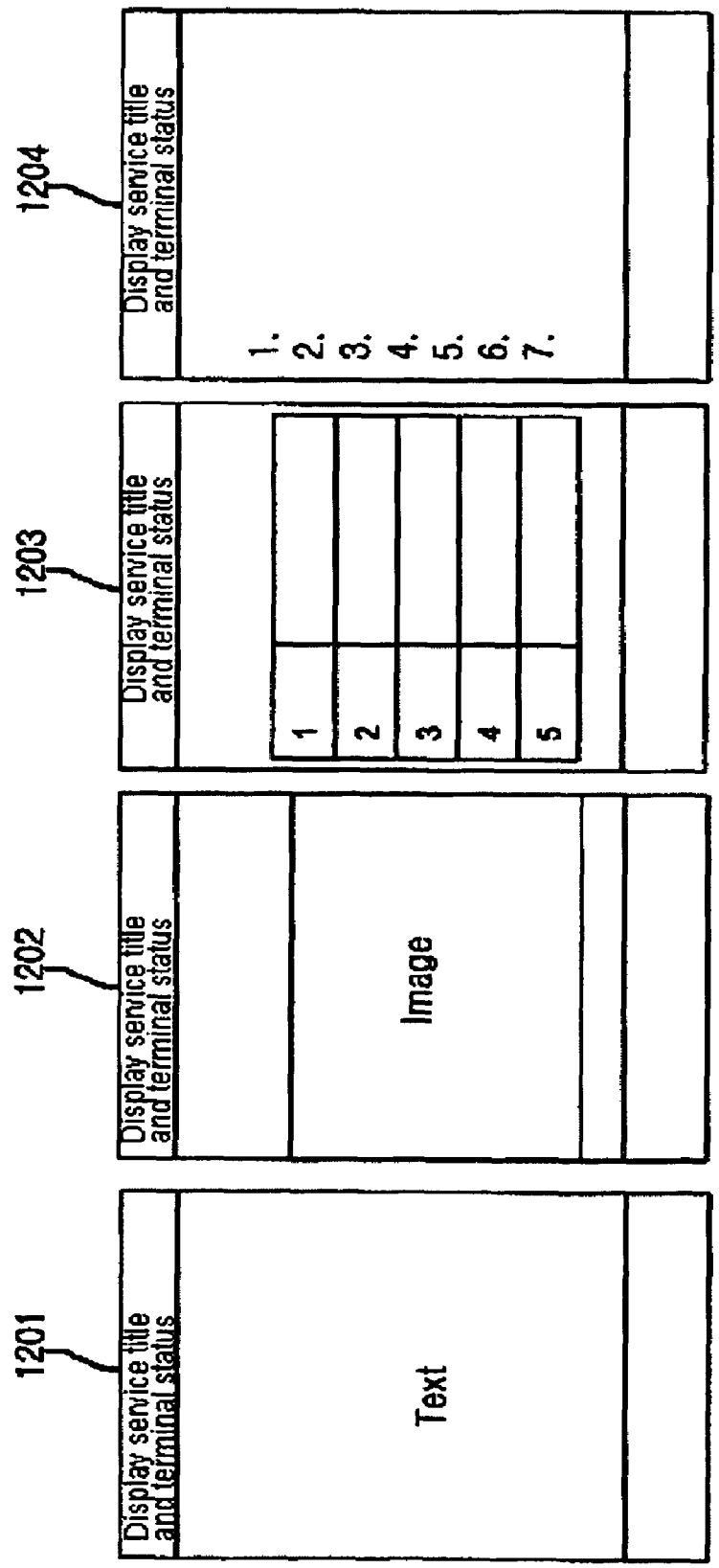
FIG. 12 is a diagrammatical view of divided screens according to an embodiment having divided multimedia screens.

FIG. 12 shows divided screens according to an embodiment having divided screens that are provided in multimedia form. As shown in FIG. 12, if corresponding contents information is selected and displayed in the region where the multimedia screen shown in FIGS. 7 to 9 is displayed, only text can be displayed (1201), only image and text or image can be displayed (1202), information can be tabled and displayed (1203), and text information can be listed and displayed (1204).

Figure 13:
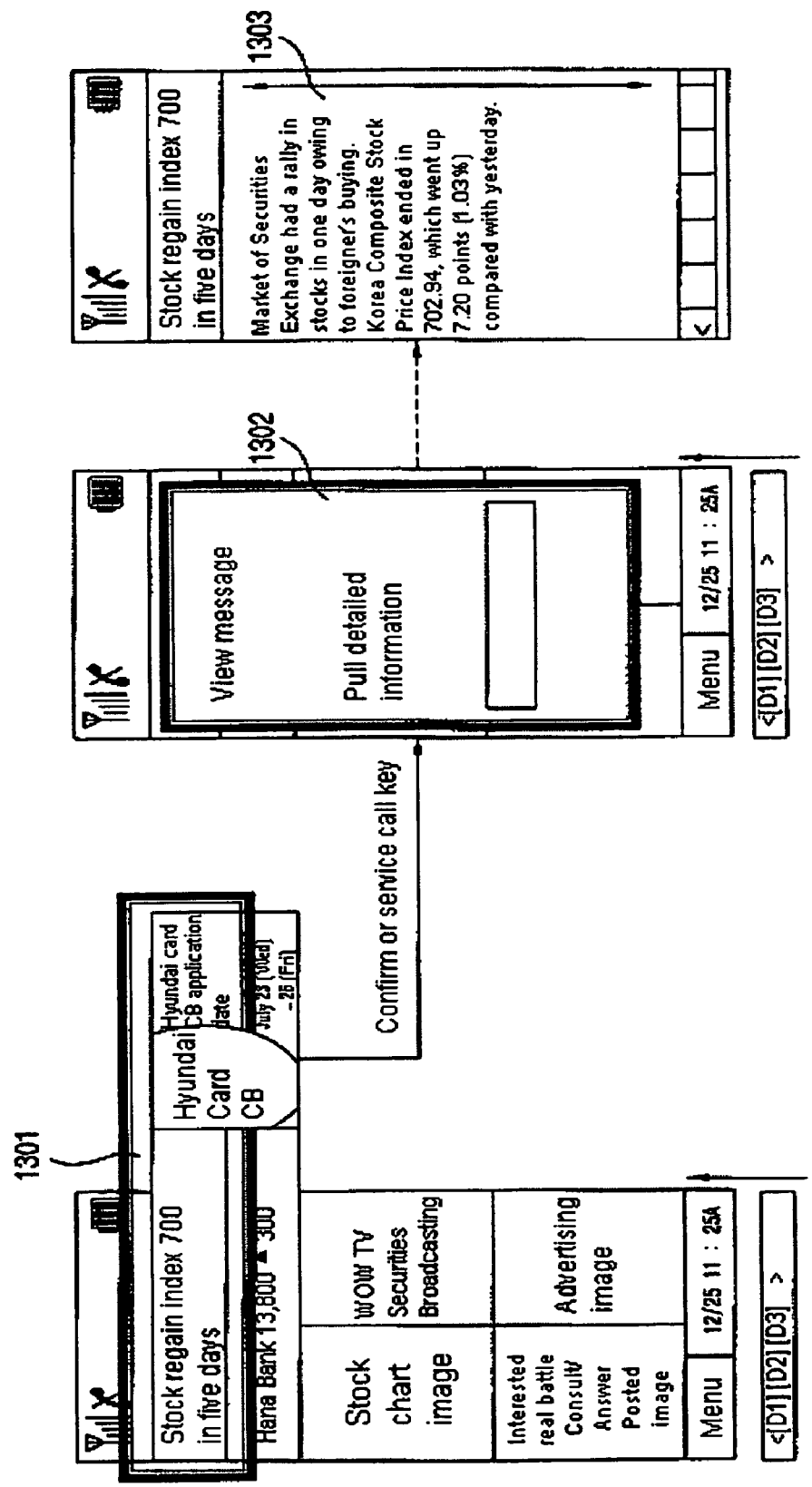
FIG. 13 is a diagrammatical view showing a sliding method, which is an example of an information display method in which content information is displayed and an information providing method according to the present invention.
Figure 14:
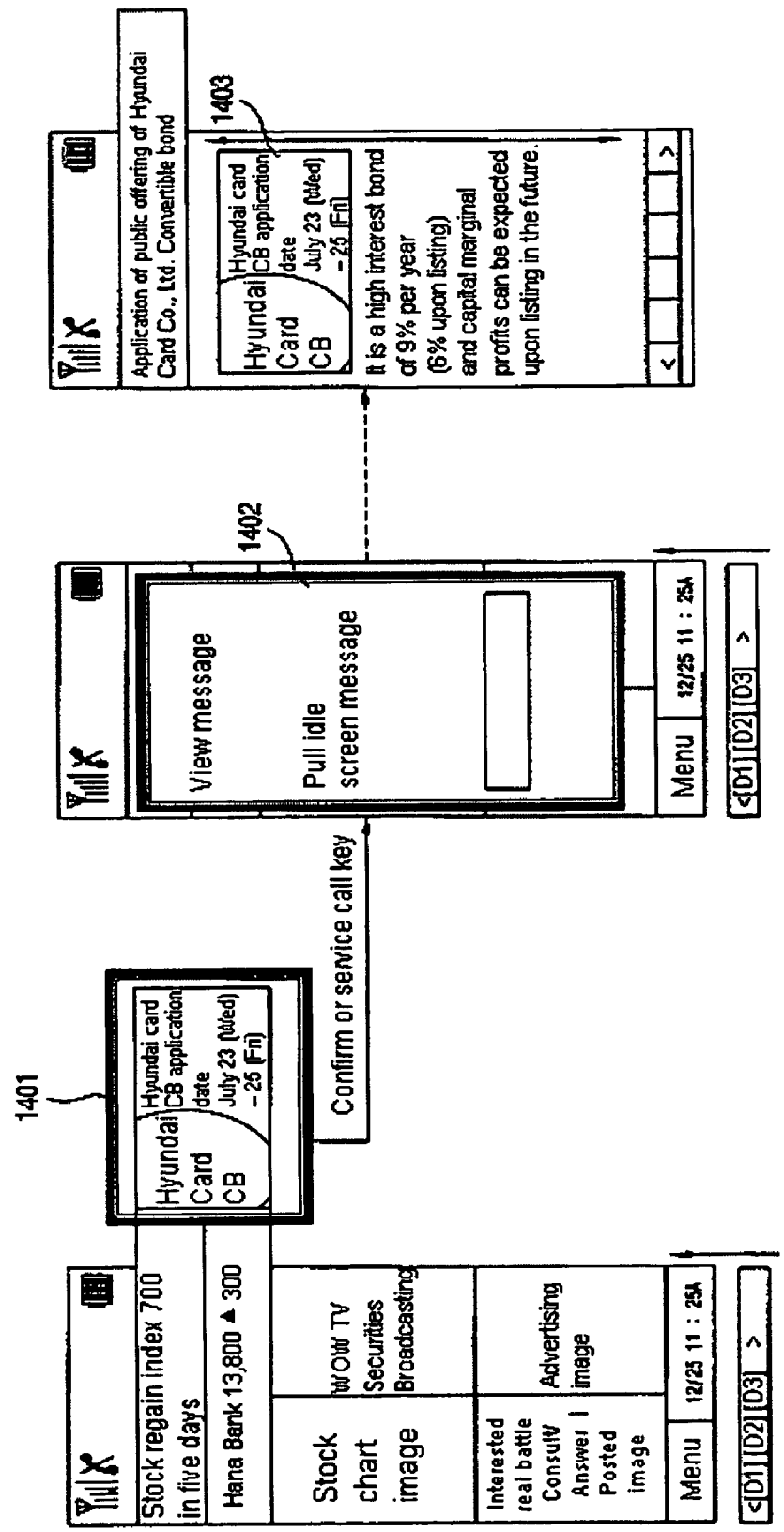
FIG. 14 is a diagrammatical view showing a sliding method, which is an example of an information display method in which content information is displayed and an information providing method according to the present invention.

FIGS. 13 and 14 are diagrammatical views showing a sliding method, which is an example of an information display method, in which content information is displayed, and an information providing method according to the present invention.

Referring to FIG. 13, if sliding text information 1301 is confirmed or a service call key is selected, a message indicating that detailed information is called is displayed on the screen window of the mobile communication terminal (1302). Detailed information corresponding to the selected information is then displayed (1303). Further, referring to FIG. 14, if sliding image information 1401 is confirmed or a service call key is selected, a message indicating that detailed information is called is displayed on a screen window of a mobile communication terminal (1402). Detailed information (image and text information) corresponding to the selected information is then displayed (1403). At this time, the display presented in 1302 and 1402 can be omitted.

Figure 15:
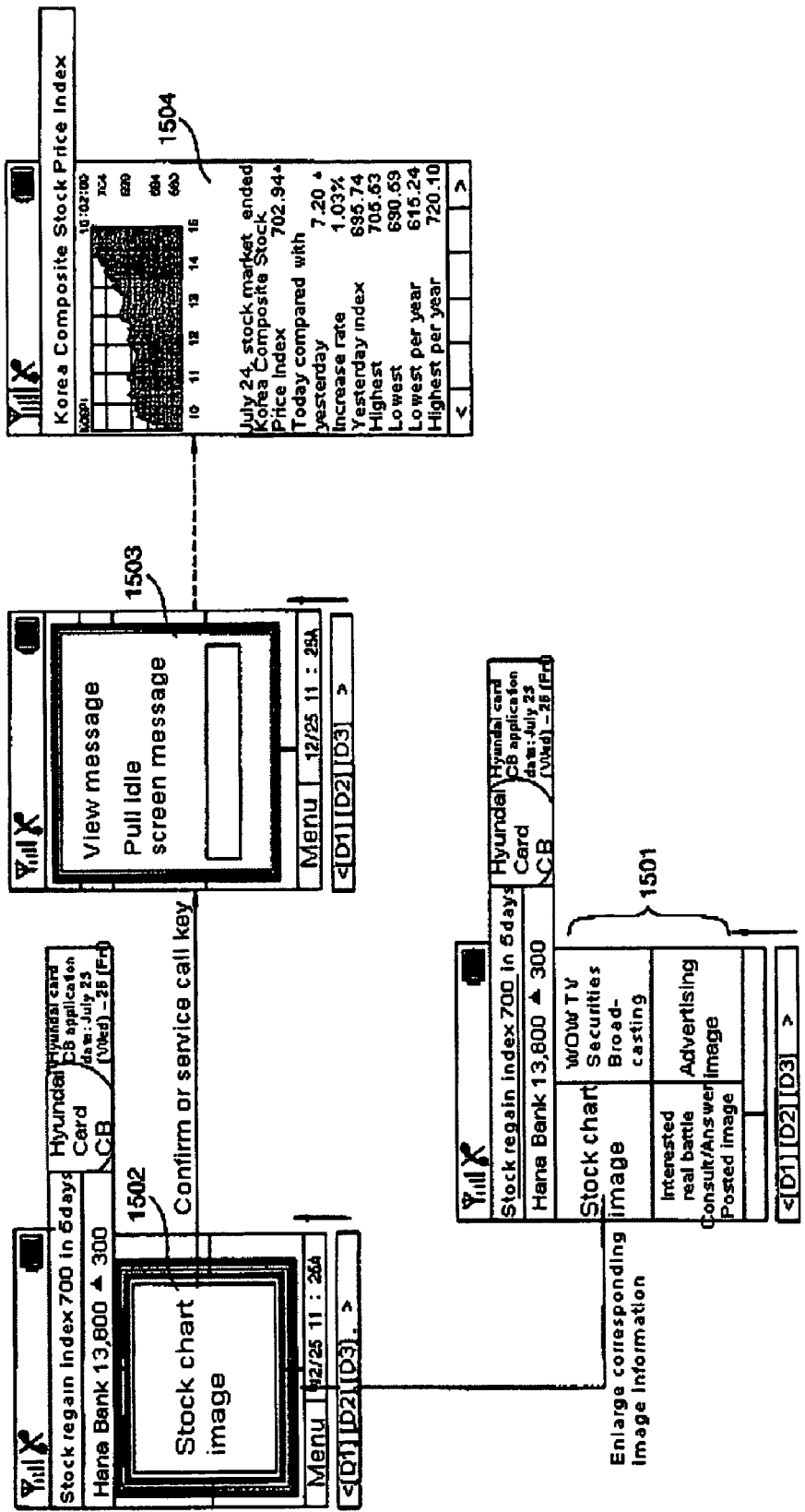
FIG. 15 is a diagrammatical view showing an icon enlargement method, which is an example of an information display method in which content information is displayed and an information providing method according to the present invention.
Figure 16:
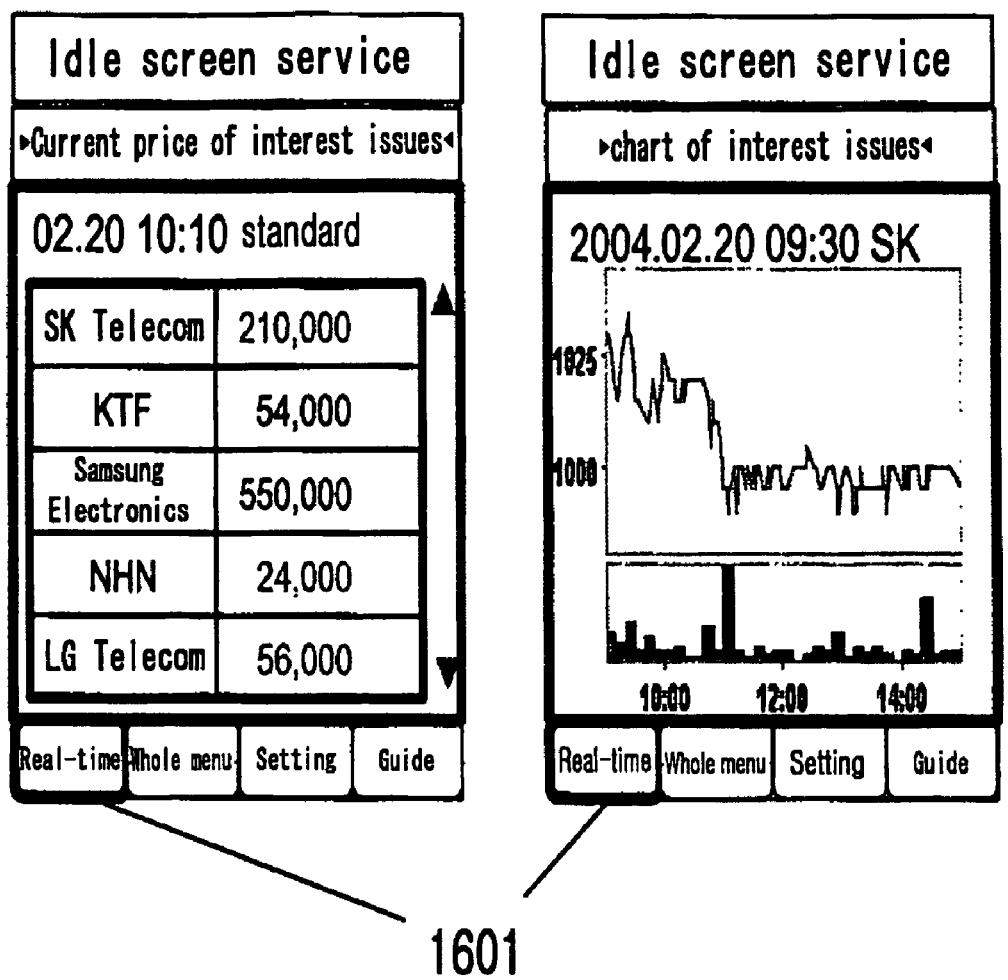

FIG. 15 is a diagrammatical view showing an icon enlargement method, which is an example of an information display method in which content information is displayed and an information providing method according to the present invention.

Referring to FIG. 15, if content information is selected from an image region 1501 that is divided and displayed in multimedia form by using an enlargement icon, a corresponding image is enlarged and displayed. At this time, it is possible to enlarge a corresponding image in the image region 1501 when it is activated using an up and down key or selected using a select key. If a confirmation or service call key is selected from an enlarged image region 1502, a message indicating that an idle screen message is called is displayed on the screen window of the mobile communication terminal (1503). Detailed information corresponding to the selected information is displayed (1504).

INDUSTRIAL APPLICABILITY

According to the present invention, in order to provide useful information to a user, the information is stored in the user's mobile communication terminal and the stored information can be displayed periodically or when an event occurs. Thus, a load on the information provider system can be removed.

Further, a user can consistently confirm the use of received idle screen information consistently or when an event occurs. It is thus possible to maximize efficient use of information.

Also, a user can set not only specialized information such as financial information and entertainment information, but also a variety of contents provided by a contents provider system using a portable mobile communication device. Thus, the type of received information can be diversified and can be used usefully in a Push & Pull mode.

Moreover, more detailed information can be provided through interactive settings through access with a related wireless Internet web site by means of a hyperlink function for receiving the information corresponding to information provided.

Further, an operator of a mobile communication network can perform advertising and campaigns for various advertising services, public notices, etc. for every customer. Thus, user-friendly management is possible.

Furthermore, internal resources that are frequently used by a user are disposed in an idle screen of a portable mobile communication device. It is thus possible to operate a user-oriented terminal.

In addition, some of the channels that are constructed as means for providing information can be transferred and leased to an external service provider. It is thus possible to provide a variety of content and information. This reduces overlapping developments in a service infrastructure and allows mobile communication resources to be more efficiently utilized and operated.

What is claimed is:

1. A method of controlling and operating resources of an idle screen for a mobile communication terminal in a system for providing contents to the mobile communication terminal, comprising:
   allowing a user to join a service to receive contents through the mobile communication terminal, and to set an information regarding the contents to receive;
   allowing a service server to operate cooperatively with a contents provider, to classify the contents received from the contents provider based on the information within the service server, and to allocate a channel and a stack;
   allowing the contents corresponding to the information set by the user to be pushed from the service server, and the pushed contents to be displayed on an idle screen, the display of the contents being based on a given template configuration;
   allowing the user to pull specific detailed contents from the service server by selecting one of the pushed contents displayed on the idle screen;
   allowing the received specific detailed contents to be read from a memory and a storage unit of the mobile communication terminal, and the contents to be displayed according to a predetermined screen configuration of the mobile communication terminal;
   configuring the idle screen to include screens divided into a first region and a second region;
   displaying the first region as divided screens, and each of the divided screens having a display mode in which corresponding contents are displayed in the form of multimedia; and
   providing the second region with a menu corresponding to the contents displayed in the first region, or a quick launch executing resources within a portable mobile communication device or a virtual machine (VM) application and configured to access to a wireless Internet web site provided in the form of an icon,
   the contents being automatically provided, without any request, to the mobile communication device from the service server, after the user sets the information.

2. The method as claimed in claim 1, wherein the divided screens in multimedia form of the first region display a title having the content information built in.

3. The method as claimed in claim 1, wherein the screens of the first region of claim 1 display channeled contents information, and the channels are divided and displayed.

4. The method as claimed in claim 1, wherein the screens of the first region are of text information, text information and image information, table information, chart or graphic information, and motion picture information containing audio information or audio information.

5. The method as claimed in claim 1, wherein each of the icon forms is configured to be added, omitted, and changed in order, and to be selectively displayed according to the input of a given key and a given status of a terminal.

6. The method as claimed in claim 1, wherein the screens in multimedia form of the first region of claim 1 are provided in the form of an icon, and
   detailed information is displayed on the whole screen, the whole display window, the whole of each of the regions or some of each of the regions in the idle screen corresponding to each content information by clicking on the divided content information icon.

7. The method as claimed in claim 1, wherein multimedia information is displayed that replaces information to be represented, or multimedia information of a look-ahead form, which is reduced from information to be represented.

8. The method as claimed in claim 1, wherein the second region includes a quick launch capable of executing resources within a portable mobile communication device or an virtual machine (VM) application and having access to an wireless Internet web site provided in the form of an icon.

9. A method of controlling and operating resources of an idle screen for a mobile communication terminal in a system for providing contents to the mobile communication terminal, comprising:
   allowing a user to join a service to receive contents through the mobile communication terminal, and to set an information regarding the contents to receive;
   allowing a service server to operate cooperatively with a contents provider, to classify the contents received from the contents provider based on the information within the service server, and to allocate a channel and a stack;
   allowing the contents corresponding to the information set by the user to be pushed from the service server, and the pushed contents to be displayed on an idle screen, the display of the contents being based on a given template configuration;
   allowing the user to pull specific detailed contents from the service server by selecting one of the pushed contents displayed on idle screen;
   allowing the received specific detailed contents to be read from a memory and a storage unit of the mobile communication terminal, and the contents to be displayed according to a predetermined screen configuration of the mobile communication terminal;
   configuring the idle screen to include screens divided into a first region and a second region;
   configuring the first region to include a display mode in which the content information is displayed as a sliding text or image in a list of a table form; and
   configuring the second region to include a menu corresponding to the contents displayed on the first region, or a quick launch capable of executing resources within a portable mobile communication device or an virtual machine (VM) application and having access to an wireless Internet web site provided in the form of an icon,
   the contents being automatically provided, without any request, to the mobile communication device from the service server, after the user sets the information.

10. The method as claimed in claim 9, wherein the screens of the first region of claim 6 display channeled contents information, and the channels are divided and displayed.

11. The method as claimed in claim 9, wherein the screens of the first region are of text information, text information and image information, table information, chart or graphic information, and motion picture information containing audio information or audio information.

12. The method as claimed in claim 9, wherein each of the icon forms is configured to be added, omitted, and changed in order, and to be selectively displayed according to the input of a given key and a given status of a terminal.

13. The method as claimed in claim 9, wherein the screens of the first region, are formed in the icon form, and
content information corresponding to a multimedia icon is displayed in detail on the whole screen, the whole display window, the whole of each of the regions or some of each of the regions by selecting the icon form or inputting a key for confirming selection.

14. The method as claimed in claim 9, wherein multimedia information is displayed that replaces information to be represented, or multimedia information of a look-ahead form, which is reduced from information to be represented.

15. The method as claimed in claim 9, wherein the content information is displayed as a sliding text.

16. A method of controlling and operating resources of an idle screen for a mobile communication terminal in a system for providing contents to the mobile communication terminal, comprising:
allowing a user to join a service to receive contents through the mobile communication terminal, and to set an information regarding the contents to receive;
allowing a service server to operate cooperatively with a contents provider, to classify the contents received from the contents provider based on the information within the service server, and to allocate a channel and a stack;
allowing the contents corresponding to the information set by the user to be pushed from the service server, and the pushed contents to be displayed on an idle screen, the display of the contents being based on a given template configuration;
allowing the user to pull specific detailed contents from the service server by selecting one of the pushed contents displayed on idle screen;
allowing the received specific detailed contents to be read from a memory and a storage unit of the mobile communication terminal, and the contents to be displayed according to a predetermined screen configuration of the mobile communication terminal;
configuring the idle screen to include screens divided into a first region, a second region, and a third region;
configuring the first region to include a display mode in which a sliding text or image is displayed;
configuring the second region to be displayed as divided screens, and each of the divided screens having a display mode in which corresponding contents are displayed in the form of multimedia; and
configuring the third region to include a menu corresponding to the contents displayed in the first region and the second region, or a quick launch configured to execute resources within a portable mobile communication device or an virtual machine (VM) application and having access to an wireless Internet web site provided in the form of an icon,
the contents being automatically provided, without any request, to the mobile communication device from the service server, after the user sets the information.

17. The method as claimed in claim 16, wherein the divided screens in multimedia form of the second region display a title having the content information built in.

18. The method as claimed in claim 16, wherein the screens of the first region and the second region, display channeled contents information, and the channels are divided and displayed.

19. The method as claimed in claim 16, wherein the screens of the first region and the second region, are of text information, text information and image information, table information, chart or graphic information, and motion picture information containing audio information or audio information.

20. The method as claimed in claim 16, wherein each of the icon forms is configured to be added, omitted, and changed in order, and to be selectively displayed according to the input of a given key and a given status of a terminal.

21. The method as claimed in claim 16 wherein the screens in multimedia form of the second region of claim 16 are provided in the form of an icon, and
detailed information is displayed on the whole screen, the whole display window, the whole of each of the regions or some of each of the regions in the idle screen corresponding to each content information by clicking on the divided content information icon.

22. The method as claimed in claim 16, wherein the screens of the first region are formed in the icon form, and
content information corresponding to a multimedia icon is displayed in detail on the whole screen, the whole display window, the whole of each of the regions or some of each of the regions by selecting the icon form or inputting a key for confirming selection.

23. The method as claimed in claim 16, wherein multimedia information is displayed that replaces information to be represented, or multimedia information of a look-ahead form, which is reduced from information to be represented.

24. A method of controlling and operating resources of an idle screen for a mobile communication terminal in a system for providing contents to the mobile communication terminal, comprising:
allowing a user to join a service to receive contents through the mobile communication terminal, and to set an information regarding the contents to receive;
allowing a service server to operate cooperatively with a contents provider, to classify the contents received from the contents provider based on the information within the service server, and to allocate a channel and a stack;
allowing the contents corresponding to the information set by the user to be pushed from the service server, and the pushed contents to be displayed on an idle screen, the display of the contents being based on a given template configuration;
allowing the user to pull specific detailed contents from the server by selecting one of the pushed contents displayed on the idle screen;
allowing the received specific detailed contents to be read from a memory and a storage unit of the mobile communication terminal, and the contents to be displayed according to a predetermined screen configuration of the mobile communication terminal;
configuring the idle screen to include screens divided into a first region, a second region, a third region, and a fourth region;
configuring the first region to include a display mode in which a sliding text or image is displayed;
configuring the second region to include a channel switch display mode in which respective contents is channeled;
configuring the third region to be displayed as divided screens, and each of the divided screens having a display mode in which corresponding contents is displayed in multimedia form; and
configuring the fourth region to include a menu corresponding to the contents displayed in the first region, the second region, and the third region, or a quick launch configured to execute resources within a portable mobile communication device or an virtual machine (VM) application and having access to an wireless Internet web site provided in the form of an icon, the contents being automatically provided, without any request, to the mobile communication device from the service server, after the user sets the information.

25. The method as claimed in claim 24, wherein the divided screens in multimedia form of the third region display a title of the contents built in.

26. The method as claimed in claim 24, wherein the screens of the first region and the third region display channeled contents, and the channels are divided and displayed.

27. The method as claimed in claim 24, wherein the screens of the first region and the third region are of text information, text information and image information, table information, chart or graphic information, and motion picture information containing audio information or audio information.

28. The method as claimed in claim 24, wherein each of the icon forms is configured to be added, omitted, and changed in order, and to be selectively displayed according to the input of a given key and a given status of a terminal.

29. The method as claimed in claim 24, wherein the screens in multimedia form of the third region of claim 8 are provided in the form of an icon, and
the specific detailed contents information are displayed on the whole screen, the whole display window, the whole of each of the regions or some of each of the regions in the idle screen corresponding to each contents by clicking on the divided contents icon.

30. The method as claimed in claim 29, wherein the icon form displays multimedia information that replaces information to be represented, or multimedia information of a look-ahead form, which is reduced from information to be represented.

31. The method as claimed in claim 24, wherein the screens of the first region are formed in the icon form, and
content information corresponding to a multimedia icon is displayed in detail on the whole screen, the whole display window, the whole of each of the regions or some of each of the regions by selecting the icon form or inputting a key for confirming selection.

32. The method as claimed in claim 31, wherein multimedia information is displayed that replaces information to be represented, or multimedia information of a look-ahead form, which is reduced from information to be represented.

33. The method as claimed in claim 24, wherein multimedia information is displayed that replaces information to be represented, or multimedia information of a look-ahead form, which is reduced from information to be represented.

* * * * *